United States Patent [19]

Morrow

[11] 4,070,671
[45] Jan. 24, 1978

[54] NAVIGATION REFERENCE SYSTEM

[75] Inventor: James A. Morrow, Huntington Beach, Calif.

[73] Assignee: Rockwell International Corporation, El Segundo, Calif.

[21] Appl. No.: 614,456

[22] Filed: Sept. 18, 1975

[51] Int. Cl.$^2$ ............................................. G01S 9/56
[52] U.S. Cl. .............................................. 343/6.5 LC
[58] Field of Search ...................... 343/6.5 R, 6.5 LC

[56] References Cited

U.S. PATENT DOCUMENTS

| 3,336,591 | 8/1967 | Michnik et al. | 343/6.5 LC |
| 3,344,420 | 9/1967 | Arsove | 343/6.5 R |
| 3,412,399 | 11/1968 | Chisholm | 343/6.5 LC |
| 3,531,801 | 9/1970 | Huebscher | 343/6.5 R X |
| 3,737,901 | 6/1973 | Scott | 343/6.5 LC X |
| 3,801,979 | 4/1974 | Chisholm | 343/6.5 LC |
| 3,858,211 | 12/1974 | Litchford | 343/6.5 LC X |
| 3,860,900 | 1/1975 | Scudder | 340/3 R |

Primary Examiner—Malcolm F. Hubler
Attorney, Agent, or Firm—H. Fredrick Hamann; Rolf M. Pitts; Allan Rothenberg

[57] ABSTRACT

A set of three or more acoustic transponders positioned below the surface of the ocean is provided with logic circuitry that enables location of transponder positions merely by listening to transponder signals and also enables location of an unknown receiving station merely by listening to transponder signals. The transponders are self-synchronizing to eliminate the need for precision timing over long periods. In a first mode, each transponder transmits a signal to the surface and retransmits upon receipt of its echo to thereby provide depth data. In a second mode the transponders transmit to each other and retransmit an acknowledge signal upon receipt of a reply from one of the other transponders. This provides data to enable a remote station to calculate distances between the respective transponders. In a third mode, geographic location of the transponders is determined and the transponders continue to transmit, each resetting itself upon each transmission, and each transmitting in a master or slave relation with respect to the others thereby to enable a receiving station to determine its position with respect of the transponders by conventional methods of hyperbolic navigation.

2 Claims, 9 Drawing Figures

NAVIGATION REFERENCE SYSTEM

BACKGROUND OF THE INVENTION

The present invention relates to navigation reference systems and more particularly concerns establishment and operation of multi-unit underwater reference systems.

In many types of operations on and below the surface of the sea, establishment of position is required. Among the various types of operations requiring such undersea position reference, are operations involving undersea construction, exploration and installation, such as carried out in the searching for and recovery of undersea minerals of various types. Underwater navigation systems may provide a common relative position reference to allow precise "reconstruction" of naval exercises, position histories of devices used in underwater acoustic or oceanographic research or other such applications, either underwater or in the atmosphere, where it is desired to accurately determine the position of one or more objects. Other examples of uses of such a reference system include submarine position fixing, surface vessel position fixing, automatic generation of track plots of such units during conduct of training and/or tactical exercises and generation of data for determination of drift tracks of devices such as "drift bottles," used to map ocean currents both at and below the surface. In the course of some of these and other operations, it is often necessary to establish and monitor the position of self-propelled or towed underwater vehicles or objects within a selected geographic area. Various types of such operations and systems heretofore available for establishing such positions are described in a paper entitled Underwater Arctic Navigation presented by J. A. Cestone and E. St. George, Jr., to the Royal Institute of Navigation, Feb. 27, 1974. Pages 36–38 of this paper describe various types of ship maneuvers employed in locating such reference transponders. U.S. Pat. No. 3,860,900 for a Method of Monitoring the Position of Towed Underwater Apparatus describes similar methods of location.

In the system described in U.S. Pat. No. 3,860,900, the three dimensional positions of a number of underwater transponders are fixed by an involved procedure often requiring long periods of operation of a surface ship. Thus, in order to determine depth of the transponder according to the method of U.S. Pat. No. 3,860,900, a surface ship is maneuvered in a cloverleaf pattern above each transponder, continuously interrogating the transponder until a minimum round trip acoustic travel time is determined to thus determine transponder depth. Thereafter, the ship is maneuvered to cross each base line, established between each pair of transponders, at its approximate midpoint and at right angles, again interrogating transponders to determine a minimum round trip acoustic travel time. This procedure is time consuming, requires the use of a surface ship for a considerable period of time and is either inaccurate or requires difficult and time consuming velocity measurement corrections. Such velocity measurement corrections are necessary because the distance measurements depend upon the velocity of sound in the water which is used together with measured time intervals to calculate distance. Sound velocity varies with many water parameters including depth, salinity and temperature. Consequently for accuracy of measurements, these variable parameters must be repetitively determined to obtain sufficiently precise corrections for the distance measurements based upon sound velocity. These corrections are of more significance because of the fact that measurements are made between the transponder at the sea bottom and a receiver at the surface. Thus, the sound being measured must travel between the bottom and the surface along a path that is subject to significant variations in pressure, temperature and salinity.

In the system of the U.S. Pat. No. 3,860,900, after the position of the transponders has been fixed, one must periodically fix the position of a surface vessel relative to the transponders by interrogating the transponders and thereafter periodically fix the position of the unknown towed equipment by employing a remote interrogation transducer which is commanded by the surface ship and then caused to interrogate the transponders. Thus, after establishment of the position of the transponders, the use of a surface ship for periodically and repetitively commanding interrogation is still required and even the remote interrogation transducer is required to actively transmit to the responders.

For those underwater reference systems which may be employed for navigation without the use of a command interrogation surface ship as in U.S. Pat. No. 3,860,900, a precise and relatively driftfree time synchronization is required. In such a system, each of a plurality of underwater transponders may transmit signals at precisely known absolute or relative times for reception by a receiving station that is to locate its own position with respect to the transmitting underwater reference stations. Thus, presuming each underwater reference station transmits at exactly the same time, the receiving station may utilize conventional hyperbolic navigation techniques to determine its position with respect to the transmitting stations. In such conventional navigation techniques, as is well known, the time difference between receipt of signals at a receiving station from two simultaneously transmitting stations of known position will establish a first curve (an hyperbola) passing through the receiving station and uniquely positioned with respect to the transmitting pair. Receipt of similar signals from a second pair establishes a second curve which intersects the first curve to establish the receiving position. However, for such systems, one must first establish the position of the underwater transmitting stations and then, having located these, must ensure that the transmissions therefrom are precisely synchronized so that such stations either transmit simultaneously or at precisely fixed times with respect to one another. Such timing requires equipment of high precision and great cost. For equipment to maintain accuracy within a tenth of a millisecond for as little as ten days, exceedingly expensive system clocks may be required. Thus, such underwater position reference systems are either expensive, have very shot lives, or require frequent resetting or checking from another station such as a surface ship or the like.

Accordingly, it is an object of the present invention to provide methods and apparatus for underwater navigation that eliminate or minimize the above-mentioned disadvantages.

SUMMARY OF THE INVENTION

In carrying out principles of the present invention in accordance with a preferred embodiment thereof, distance of a transponder from a reply location is determined by transmitting an interrogation signal from the transponder to the reply location, returning a reply signal from the location and then causing the transponder to transmit an acknowledgement signal upon receipt of the reply signal. Time between signals transmitted from the transponders and received at a remote station provides data for calculation of the distance between the transponder and the reply location. This technique is useful for determining depths, where the reply location is a signal reflective surface such as the water surface. It is also useful for determining distance between two transponders, where a second transponder is positioned at the reply location to reply to the first transponder.

According to a feature of the invention, each of a number of transponders is provided with internal logic which causes it to operate in a second mode to transmit and respond to others of the transponders in selected sequences so as to provide data to a remote station for calculation of distances between transponders of respective pairs of transponders.

In a third mode, after having established relative positions of the transponders or after having established both relative and absolute geographical positions of the transponders, the transponder internal logic causes these to transmit signals that enable the passive receiving station to readily determine its position with respect to the transponders by conventional techniques. In this mode, as in others, the transponders are independent of commands, interrogation signals or synchronizing signals received from external sources and, moreover, are self-synchronizing. According to this feature of this invention, one of the transponders transmits a master signal and others transmit replies upon receipt of the master signal. All reset their internal clocks in relation to a master transmission.

DETAILED DESCRIPTION

General Description

Figure 1:
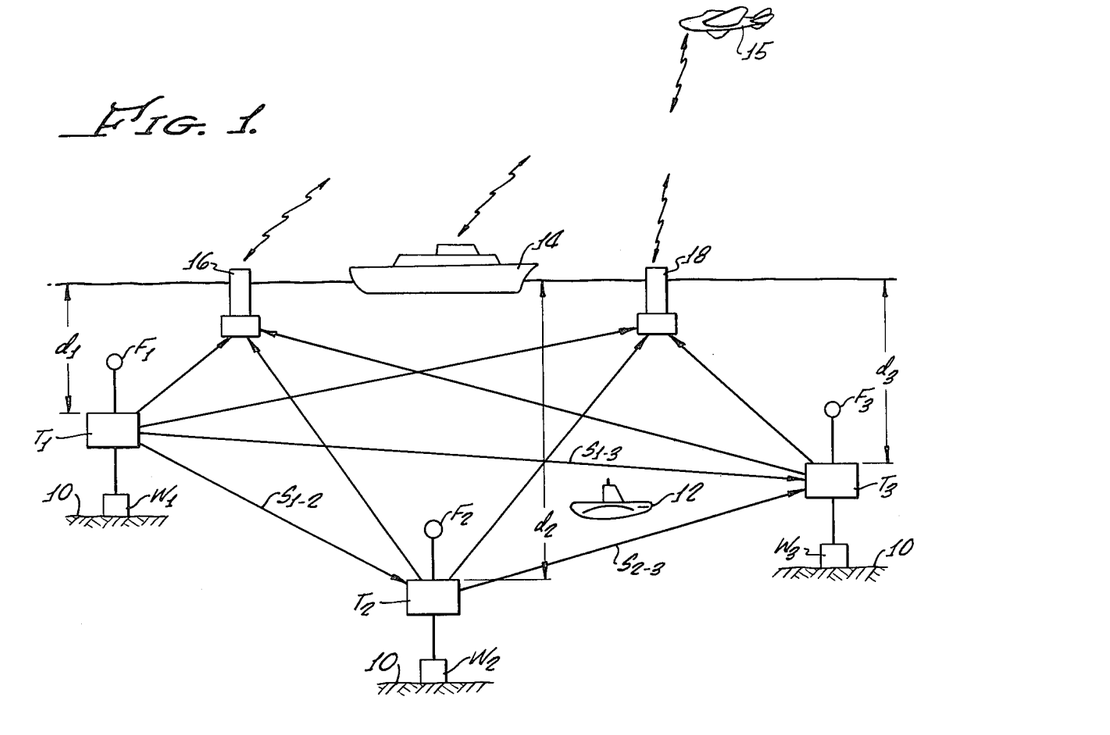
FIG. 1 illustrates a plurality of transponders positioned underwater and other receiving stations adapted to receive signals from the transponders.

As illustrated in FIG. 1 a plurality of transponders $T_1$, $T_2$, $T_3$, are emplaced on the bottom of the ocean, indicated at 10. Each transponder is identical to each of the others, except for certain programming and presetting of electronics to be described below, and comprises receiving and transmitting hydrophones, a transmitter, a receiver and associated electronics and control logic.

Each transponder is connected to a respective weight $W_1$, $W_2$, $W_3$ and to a respective float $F_1$, $F_2$, $F_3$ by connecting lines that cause the transponder to remain anchored to the bottom but positioned somewhat above the bottom, as one hundred feet above for example, in order to avoid burying the instrumentation in soft sea bottom material. The transponders may be placed by any one of a number of means. They may be dropped over the side of a surface ship or dropped from a helicopter or other aircraft into selected locations that will be approximately one-half to three miles apart. Generally, such transponders may be employed in water depths of several thousand to several tens of thousands of feet although no critical limitations of water depth are involved.

The transponders primarily function, after their relative positions have been established as described hereinafter, to periodically emit signals which may be received by an underwater object 12 which may be towed by a surface ship or comprise a self-propelled vehicle such as an underwater work boat, for example. Signals transmitted by the transponders are received by the vehicle 12 and time differences of reception from two or more pairs of transponders are noted. Employing conventional techniques of hyperbolic navigation, position of the vehicle 12 with respect to the transponders $T_1$, $T_2$, $T_3$ is readily determined on the basis of the noted time differences. Equipment for making the necessary computations may be carried aboard the vehicle 12 or the latter may simply retransmit received information to some remote station for recording and calculation. A surface ship 14 may also receive signals transmitted by the transponders and make the necessary calculations to determine its own position with respect thereto or transmit such information to an overflying aircraft 15 or satellite or to a remote shore station for calculation of the position of the surface ship 14 relative to the transponders.

To enable the transponders to transmit information that may be used to determine position of the receiving station, it is first necessary to determine the relative positions of the transponders with respect to one another. Where position of the vehicle 12 or ship 14 are to be determined as an absolute geographic position, it is necessary, in addition to determining the positions of the transponders relative to one another, to determine their position with respect to an absolute geographic reference system.

To determine position of the transponders they are operable in two modes. In a first mode, mode A, the transponders collect and transmit information for calculating depth of each, individually. In a second mode, mode B, the transponders collect and transmit information that enables calculation of horizontal distance between transponders of each of the three pairs illustrated. In a third mode of operation, mode C, the transponders continuously transmit signals and synchronize themselves, so that reception of these signals by an unknown receiver such as a receiver carried by vehicles 12 or 14 enables calculation of the position of the receiving vehicle with respect to the transponders. Where absolute position of the transponders is desired, the third mode, mode C, may be initially employed together with a pair of receivers, as for example, sonobuoys 16, 18 riding at the water surface in known geographic locations. These known location receivers will receive information transmitted from the transponders in mode C and transmit to a remote station, such as the surface ship 14 or an overhead aircraft or a remote land station, information from which the absolute geographic position of the transponders may be calculated.

The transponders provide a self-contained system that requires no external control or command (except for initiation of operation). The transponders are each independent of receipt of information from equipment external to the transponder system. The system operates automatically, independently and self-synchronously whereby it will transmit information for determination of transponder positions without requiring any maneuvers or other operation of another vehicle or station, except to receive and analyze data. Similarly, after establishing transponder position, the system continues to synchronize itself and transmit data that may be received and analyzed by a vehicle or station of which the position is to be determined.

The transponders are initially set into operation just before they are deployed and are thus operating in their first mode, mode A, as they sink below the surface of the water and anchor themselves to the bottom. In a mode A each transponder operates independently of each other and each transmits a signal which travels to the water surface and is reflected from this surface. The reflection from the surface is received by the transmitting transponder. Upon receipt of the reflection from the surface, each transponder is caused to immediately transmit an acknowledgement signal. A remote station such as one of the sonobuoys 16 and 18, or suitable receiving equipment on some other surface or remote facility, receives the two transmissions of each transponder, measures the time interval between arrival of the two transmissions and can therefore calculate the depth $d_1$, $d_2$ or $d_3$ of the respective transponders.

The remote receiver receives its first signal as the signal initially transmitted by the transponder and receives its second signal as the acknowledgement signal which is transmitted by the same transponder immediately (or with known delay) upon receipt of the reflection from the surface. Thus, the depth $d_1$ of the transponder $T_1$ may be calculated as the product of one-half of the time interval between receipt of pulses from this transponder and the velocity of sound in water. Each transponder transmits omnidirectionally and each is caused to transmit a uniquely identifiable signal. The transponder signals may be uniquely identified by many means well known to those skilled in the art including digital coding, various modulation techniques and frequency differences. Each transponder is capable of receiving all transmitted signals but may be set to selectively respond to a particular one of the uniquely identified signals.

The depth measurement in mode A is subject to variations in the sound velocity due to the parameters previously mentioned including temperature, salinity and pressure and accordingly, for accurate computations such parameters should be measured and suitable corrections applied. However, the depth measurement is but one aspect of the position location data collection of the transponders. In the alternative depth may be measured by various other means well known to those skilled in the art including depth gauges and active sonar devices.

Having measured depth and desiring to determine the horizontal distance between the transponders, one must now generate data to enable computation of the slant range distance between the transponders. This is achieved in a manner somewhat analogous to the described depth measurement. Thus, one transponder, $T_1$, for example, is caused to transmit a signal which is received by a second transponder such as $T_2$. Transponder $T_2$ immediately responds by transmitting a reply which is received by the first transponder $T_1$. This transponder in turn immediately acknowledges receipt of the reply signal and thus this first transponder $T_1$ has transmitted twice, its initial transmission and its acknowledgement signal. The time between transmission of these two signals from transponder $T_1$, when multiplied by the velocity of sound in the water is equal to twice the slant range distance $S_{1-2}$ between transponders $T_1$ and $T_2$. These two signals are received at a remote station such as the surface buoys 16 or 18 or surface ship 14 which can carry out the necessary calculations or transmit the information in the form of the time interval between received pulses to some further remote station for completion of the calculation. Transmission by each transponder in reply to receipt of a signal may be either immediate or with a predetermined delay in all cases.

Figure 2:
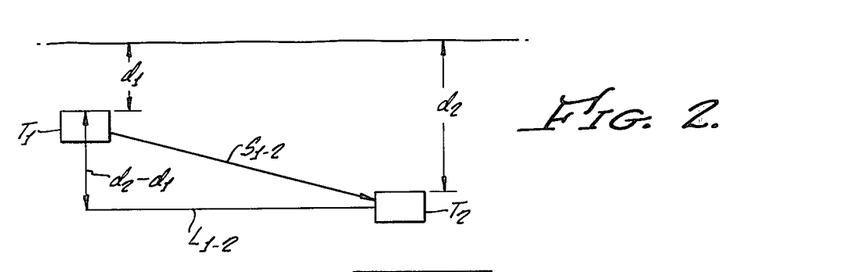
FIG. 2 illustrates geometry of a computation of horizontal distance between a pair of transponders.

As illustrated in FIG. 2, the horizontal distance $L_{1-2}$ between a pair of transponders $T_1$ and $T_2$ is readily calculated as the leg of a right triangle having a second leg to $d_2 - d_1$ and a hypotenuse of $S_{1-2}$.

Each of the slant ranges and accordingly each of the horizontal distances may be measured and calculated in a like manner. Thus, for measurement of the horizontal distance between transponders $T_2$ and $T_3$, the slant range distance $S_{2-3}$ is measured by causing transponder $T_2$ to transmit and receive a reply from transponder $T_3$ which responds upon receipt of the transmission from $T_2$. Upon receipt of a reply from $T_3$, transponder $T_2$ transmits an acknowledgement signal and thus its initial transmission and its acknowledgement signal collectively define a time interval that is twice the distance $S_{2-3}$ divided by the velocity of sound in water. In a like manner, the slant range $S_{1-3}$ is calculated employing either one of transponders $T_1$ and $T_3$ as a master and the other as a slave and thereby enabling the calculation of the horizontal distance between transponders $T_1$ and $T_3$.

It is to be noted that this measurement of slant range is basically performed between a pair of transducers on the bottom of the water. Therefore, relatively little vertical travel of the transmitted signal is required. Because the measurement of interest is made between stations having relatively small difference in depth, the factors described above as affecting sound velocity, including salinity, temperature and depth, remain relatively constant and do not vary greatly from time to time or day to day. Accordingly, errors due to these factors are relatively easily corrected and the measurements are easily made with considerably greater accuracy than would be the case where the path of the sound extended between the bottom and the surface of the water. Although the two transmissions of any one transponder, its initial transmission and its acknowledgement transmission, are transmitted to the remote station at the surface, it is the difference in arrival times of these signals that is of interest. For this reason, variations in the sound velocity along this considerably more vertically directed path are cancelled by determination of the time interval between arrival of these two signals.

Having generated and transmitted data enabling the calculation of the horizontal legs or distances between each of the three transponders, the relative locations of the transponders are known and the system may proceed to operate in mode C wherein an unknown receiver carried by the vehicle 12 or 14 may locate itself with respect to the transponders. Nevertheless, for those situations where absolute geographic position is required, this same mode C operation may be employed to obtain an absolute geographic position of the several transponders.

In mode C, one of the transponders is made a master and the others are slaves. The master transmits at periodic intervals. Each slave receives the transmission and immediately replies with its own transmission. A remote receiving station such as the sonar buoy 16 or 18 receives the transmission of the master and also receives the reply of each of the slave transponders. If these signals, the transmission of the master transponder and the reply of the slave transponder, had been transmitted from the transponders simultaneously, the remote receiving station 16 having a known geographic position and a second remote receiving station 18 having a known geographic position spaced from the first station 16, obtain enough information from the time difference between receipt of signals from transponders of a single pair to calculate the positions of the transponders with respect to the receiving station 16, 18 according to conventional techniques of hyperbolic navigation. However, the transponders of a pair, the master and the slave, do not transmit simultaneously. The slave transmits at a time after transmission of the master which is equal to the time required for the sound to travel from the master to the slave along the slant range $S_{1-2}$ for transponders $T_1$ and $T_2$, for example. Thus, knowing the slant range $S_{1-2}$ and accordingly, the travel time of a sound wave between transponders $T_1$ and $T_2$ (as determined from data generated in mode B), this travel time between $T_1$ and $T_2$ may be subtracted from the time interval between receipt of signals (at the stations 16, 18) from transponders $T_1$ and $T_2$ to provide the time difference to be employed for calculation of geographic positions of the transponders with respect to the stations 16, 18.

The absolute geographic positions of each of the transponders $T_1$, $T_2$ and $T_3$ may be calculated from information transmitted to the two fixed stations 16 and 18 by causing one transponder $T_1$ to transmit as the master and each of the other transponders $T_2$ and $T_3$ to transmit as a slave in response to receipt from the master of a signal from the master. Each station 16, 18 receives transmissions from a pair of transponders and the time difference of arrival of signals of such pair is employed for each of the three pairs of transponders $T_1$, $T_2$; $T_2$, $T_3$; and $T_1$, $T_3$ for calculation of geographic position of the transponders with respect to the known positions of the two buoys 16, 18.

Having calculated geographic position, the navigation reference system is fully established and the system continues in the described Mode C with one transponder periodically transmitting as the master and each of the others immediately transmitting as a slave upon receipt of a transmission from the master. Now an unknown remote station such as a station contained on the vehicle 12 or 14, will receive signals from two or more pairs of transponders and thus may readily determine its position with respect to the several transponders. This operation in mode C will continue indefinitely until it is stopped by a remote command, or until the transponders are released, having ended their mission, or until their self-contained power supplies are exhausted. Synchronism is not required where only one transponder is master.

Where two or more transponders alternate as masters, indefinite operation for periods of days, months or longer will continue without loss of synchronism because of the unique self-synchronizing operation provided by the transponder electronics. Each transponder includes a clock which provides timing control for its various operations as will be described hereinafter and this clock is reset in mode C at a selected time with respect to receipt of a signal by the individual transponder. For maximum protection against long term drift of the self-contained clocks, each transponder may reset its own clock to a midpoint of a cycle upon receipt of a transmitted signal. Thus, a relatively large amount of drift in either direction may be tolerated. In an embodiment actually mechanized and described hereinafter, the transponders are self-synchronized in a slightly different manner in that each resets its clock to a specified point (the transmission point) of its cycle upon receipt of a transmitted signal. In any event, this self-synchronization enables use of relatively inexpensive clocks having relatively large amounts of drift but still provides a system capable of properly operating for long periods of time.

It will be readily appreciated that the mode B operation in which the several transponders transmit and reply to one another in order to measure the three slant ranges between the three pairs of the transponders of the illustrated set of three, can be performed in many different sequences. Thus, one may use a burst-type of operation wherein one transponder such as $T_1$ is a master and transmits to both of the others which are slaves. The latter reply to the first and, in so doing each slave, itself transmits as a master. All acknowledge such receipt. Many variations on this burst mode of operations will be readily apparent and many sequences may be employed. The burst system is relatively rapid but requires more careful identification and coding of unique transmissions, replies and acknowledgement signals. Alternatively, mode B may be carried out one step at a time in a sequence in which information is collected for measurement of one slant range and after this information has been collected and transmitted, a similar process is carried out for a second slant range. Upon completion of this sequence, the third set of data is collected and transmitted for the third slant range.

THREE TRANSPONDER MODE B OPERATION

Figure 3:
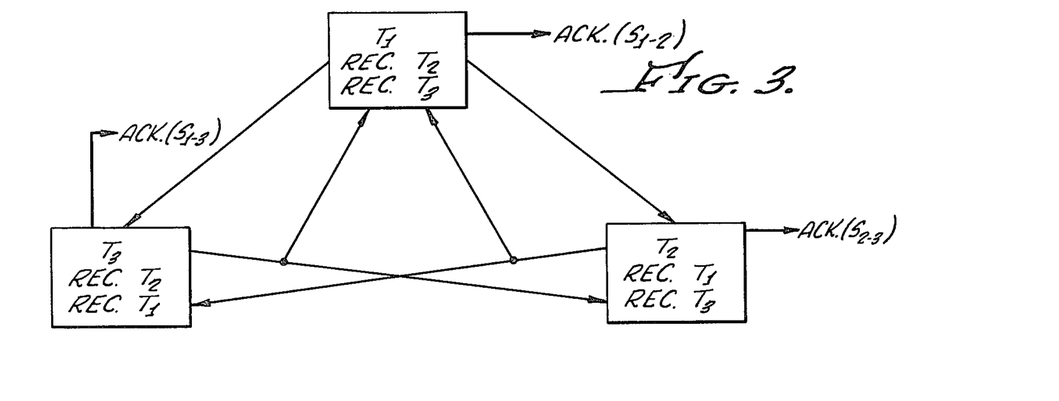
FIG. 3 comprises a functional illustration of a sequence of self-coordinated transponder operations for generating data for calculation of slant range distances between transponders.

An example of one of many different possible sequences in a burst-type of operation in mode B employing three transponders is illustrated in FIG. 3. It is assumed that the several transponders each transmits upon a unique frequency, the transmitting frequencies of each transponder being different than the transmitting frequencies of all other transponders. Each transponder is capable of selectively receiving one and only one (at a given time and receiver setting) of the transmitting frequencies of the oters. In such a system, operation in mode B (to determine slant range distances) is carried out by causing different transponders to be masters and slaves at different times. The remote receiver of course receives and identifies all transmissions in modes A and B.

As an example, transponder $T_1$ initially is the master and transponder $T_2$ is a slave. $T_1$ is set to receive the transmitting frequency of $T_2$ and $T_2$ is initially set to receive the transmitting frequency of $T_1$. $T_1$ transmits to $T_2$ and $T_2$, upon receipt of this transmission replies to $T_1$ which thereupon sends out a second transmission acknowledging receipt of the reply from $T_2$, thus completing the data collection for the measurement of the slant range from $T_1$ to $T_2$.

Upon receipt of the signal from $T_1$, transponder $T_2$ changes its receiver to selectively receive the transmission of transponder $T_3$. Similarly, at this time, transponder $T_3$ is set to receive the transmission frequency of transponder $T_2$. Thus, $T_2$ becomes a master and its reply to the initial transmission of $T_1$ is also received by transponder $T_3$ which itself replies. The reply of $T_3$ is received by $T_2$ which thereupon sends out an acknowledgement signal which completes the acquisition of data for measurement of the slant range distance $S_{2-3}$.

$T_3$ is also a master in that its reply in response to receipt of the signal from $T_2$ is also received by transponder $T_1$ which has set its receiver to receive the transmission of transponder $T_3$ when transponder $T_1$ had received the reply from transponder $T_2$. $T_1$ receives the transmission of $T_3$ and replies. $T_3$ which had reset its receiver to receive $T_1$ after $T_3$ had received and replied to the transmission of $T_2$, now receives the transmission of $T_1$ and sends out an acknowledgement pulse thus completing the generation of data for measurement of slant range $S_{1-3}$. This "sing-around" may be repeated exactly or subsequent repetitions may be initiated by the other transponders $T_2$ and $T_3$ for providing plural sets of data.

Although a system of three transponders will perform all of the essential functions of the described system including depth measurement of mode A, slant range measurement of mode B and location identification of mode C, it is preferred to employ four or more transponders to have a measure of redundancy. It will be readily appreciated that relatively large numbers of transponders may be employed and operated in groups of three or four to provide an extensive interlocking network of navigation reference points covering a large area or a relatively narrow (one to three miles) corridor in which position of an unknown receiver may be readily determined merely by listening to the transponder transmissions and thereupon performing conventional calculations of hyperbolic navigation.

FOUR TRANSPONDER SYSTEM

The invention has been initially embodied in a system of four transponders each of which transmits on a unique transmitting frequency and each of which includes a receiver and filters that can be operated to selectively receive any one of the four transmitting frequencies and which in addition, can receive a fifth frequency. The latter may be a relatively low frequency modulation on a carrier that is employed for operation of a remotely controlled release for recovery of the transponders or for selectively recycling the transponders to return to the initial mode A operation when desired.

With this set of four transponders operation in mode A is carried out just as previously described with each transponder performing independently of each other and repetitively sending a transmission to the surface, waiting for a reply in the form of a reflection in the surface and, immediately upon receipt of such reply, transmitting an acknowledgement pulse. Thereafter, the transponder will remain at rest for the duration of one full cycle (which may be on the order of four minutes) and then again transmit to the surface for a second depth measurement. In an exemplary embodiment, the system initially is caused to operate in mode A for four hours performing approximately sixty repetitions of each depth measurement. Upon recycling, this system will remain in mode A for approximately 15 minutes making considerably fewer depth measurements. In any event, after completion of the predetermined number of repetitive depth measurements, the system automatically shifts into mode B which, in the exemplary embodiment requires about 20 minutes. During this 20 minutes, the system performs six different steps or sequences, one after the other, in which repetitive data is collected and generated to enable determination of the six slant range distances between each of the four pairs of transponders in a four transponder set. In the exemplary embodiment, each step or sequence requires four minutes and 16 seconds although only a relatively few seconds of this more than 4-minute period is required to send and receive the several signals. The remaining time allows for subsiding of reverberations thay may yield spurious information. Thus, for measurement of a slant range distance of three miles, for example, the round trip travel time of a single from one transponder to another may be in the order of six seconds and the additional time required to travel to the surface in a three-mile depth may be approximately 3 to 6 seconds thus requiring a total of about 12 seconds for collection of all the information of a single slant range. Several slant ranges are measured in each cycle or sequence so that the system is active for roughtly one minute. Then the system remains quiescent until a full four-minute and sixteen second cycle has been completed. When 4 minutes and 16 seconds has elapsed subsequent to the first transmission of a sequence, the next sequence commences.

MODE B

Figure 4:
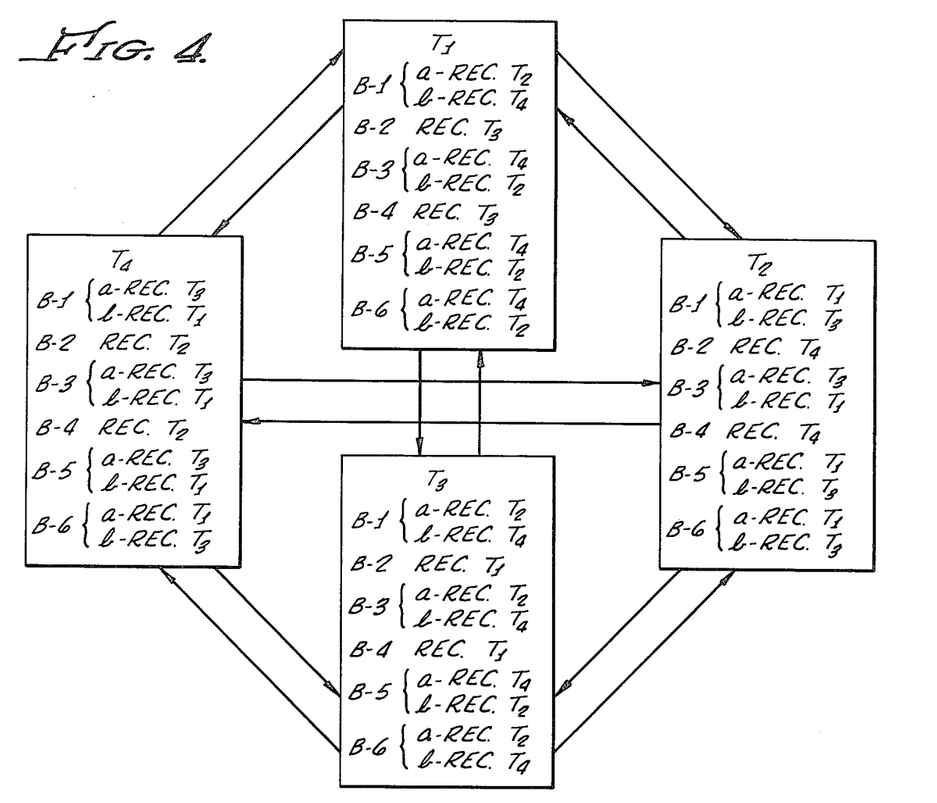
FIG. 4 is a functional illustration of the sequences of operations of a system of four transponders in the course of generating data for defining slant range distances between the transponders.

In the B mode operation illustrated in FIG. 4, six steps or sequences are employed, each being performed in one of the six cycles that occur during the B mode operation. The sequences may be identified as B-1, B-2, B-3, B-4, B-5 and B-6. In the exemplary embodiment, a so-called sing-around operation is performed in sequences B-1, B-3, B-5 and B-6 and diagonal measurements are performed in sequences B-2 and B-4. In a sing-around sequence, one transponder is a master, transmits to a second which both replies to the first and transmits to a third. The third then both replies to the second and transmits to the fourth and the latter both replies to the third and transmits to the first. Each transponder, of course, transmits an acknowledgement signal upon receipt of any reply.

In the diagonal measurement transponder $T_1$ transmits to $T_3$ which, in turn, replies to $T_1$ and the latter acknowledges. Transponder $T_2$ transmits to transponder $T_4$, the latter replying to $T_2$ which then acknowledges.

In the initial B sequence, B-1, transponder $T_1$ is set first to receive $T_2$, transponder $T_2$ is set to receive $T_1$, transponder $T_3$ is set to receive $T_2$, and transponder $T_4$ is set to receive transponder $T_3$. In FIG. 4 the first and second receiver settings are denoted by "a" and "b" respectively. Transmissions between the several transponders in FIG. 4 are denoted by the pair of arrows extending between boxes labeled $T_1$, $T_2$, $T_3$ and $T_4$ which denote the four transponders. In each box (for each transponder), the six sequences are listed and the first (a) and second (b) receiving frequencies are identified. The receiver frequency selections, denoted as "a" are the initial frequencies chosen for the first B sequence. In the course of this B sequence, the receiver frequency selection is changed to a second receiving frequency as will be described. A system clock produces cycle start (T+4) and mid-cycle (T+2) signals. Upon occurrence of a cycle start signal in the first B mode sequence, $T_1$ transmits to $T_2$ which replies to $T_1$ and the latter, in turn, transmits an acknowledgement signal. Upon receipt of transmission from $T_1$, and $T_2$ receiver is reset to receive $T_3$ (as indicated at "b" for $T_2$). Likewise, upon receipt of the reply from $T_2$, the $T_1$ receiver is set to receive $T_4$ (as indicated at "b" for $T_1$). The reply of $T_2$ to $T_1$ is also received by $T_3$ which, in turn, replies to $T_2$ and then resets its receiver to receive $T_4$. $T_2$ acknowledges the $T_3$ reply by a transmission and the reply of $T_3$ to $T_2$ is also received by $T_4$. $T_4$ replies to $T_3$ and resets its receiver to receive $T_1$. $T_3$ acknowledges the reply from $T_4$ which is also received by $T_1$. $T_1$ replies to $T_4$ and goes into an end of sequence condition. $T_4$ acknowledges the receipt of $T_1$ and goes into its end of sequence condition. Upon acknowledging the reply from $T_3$, $T_2$ goes into its end of sequence condition. Upon acknowledgement of the reply from $T_4$, $T_3$ goes into its end of sequence condition. In end of sequence condition the receivers are inhibited.

In this B-1 sequence, data is collected and measured for the four legs $T_1 - T_2$, $T_2 - T_3$, $T_3 - T_4$ and $T_4 - T_1$. This entire sing around sequence, the first sequence in mode B operation, requires a relatively short time, depending upon the distances between several transponders. The transponders remain in their end of sequence condition for a period of sixty seconds. Then, upon occurrence of the next mid-cycle signal (T+2), the receivers are set for the second sequence of mode B operation which is a diagonal measurement. In this second sequence (B-2), $T_1$ receives $T_3$, $T_3$ receives $T_1$, and $T_2$ and $T_4$ similarly are each set to respectively receive the other. No receiver changes take place in B-1. Upon occurrence of the following T+4 (cycle start) signal, both $T_1$ and $T_2$ transmit, $T_3$ receiving $T_1$ and $T_4$ receiving $T_2$. $T_3$ and $T_4$ each reply, $T_2$ receiving $T_4$'s reply and $T_1$ receiving $T_3$'s reply. Each of $T_1$ and $T_2$ acknowledges receipt of the reply and each goes into its end of sequence condition to inhibit its receiver. Each of $T_3$ and $T_4$ upon transmitting its reply goes into its end of sequence condition.

Now the system awaits the next T+2 pulse at which time all receivers are reset to the initial conditions of the third sequence B-3. Thereupon, when the next T+4 pulse occurs, the third mode B sequence is initiated. This is a sing-around like the first sequence but is initiated by transponder $T_2$ (which is the first master in this sequence). Thus, for this third sequence the receivers are initially set so that $T_3$ receives $T_2$ and $T_2$ receives $T_3$. $T_4$ receives $T_3$ and $T_1$ receives $T_4$. The third sequence is initiated when $T_2$ transmits to $T_3$ which replies to $T_2$, the latter acknowledging by transmitting an acknowledgement signal. The $T_3$ reply is received by $T_4$ which replies to $T_3$ thereby causing the latter to transmit an acknowledgement signal and go into its end of sequence condition. The reply of $T_4$ is also received by $T_1$ which replies to $T_4$ causing the latter to send an acknowledgement signal and go into its end of sequence condition. The reply of $T_1$ to $T_4$ is received by $T_2$ which changes receivers to receive $T_1$ upon acknowledging the reply from $T_3$. $T_2$ replies to $T_1$ and goes into its end of sequence condition. $T_1$ acknowledges this reply and then goes into end of sequence condition. $T_3$ after reply to $T_2$ sets it receiver to receive $T_4$. Similarly, transponder $T_4$ after reply to $T_3$ sets its receiver to receive $T_1$. $T_1$ after reply to $T_4$ sets its receiver to receive $T_2$ and $T_2$ after acknowledging receipt of $T_3$ sets its receiver to receive $T_1$.

The fourth sequence, B-4 in mode B is a second diagonal measurement which is identical to the first diagonal measurement carried out in the second sequence.

The fifth sequence, B-5 is another sing around sequence in which transmission is initiated by $T_3$ causing each of $T_4$, $T_1$ and $T_2$ to reply and transmit to the next transponder in turn as described in connection with the first and third sequences. B-5 differs only in that this sing-around transmission is initiated by $T_3$. Similarly, the sixth and final sequence of mode B, B-6, is a sing-around similar to the other sing arounds but in which operation is initiated by transponder $T_4$ causing each of the other transponders in sequence to reply and also to transmit to the following transponder in the same sequence. Thus, in mode B, the system collects and transmits data four times for each leg and twice for diagonal. At the midpoint of each cycle, the receivers are reset for the next sequence.

At the midpoint of the B-6 sequence however, all receivers are set for the mode C operation which commences at the end of the cycle in which sequence B-6 is performed.

MODE C

In mode C operation only one transponder need be master and all others may be slaves. Nevertheless, in order to take advantage of the redundancy afforded by the use of a set of four transponders, mode C operation is caused to have two sequences which alternate with each other. In a first sequence $T_1$ is a master and all others are slaves and in the second sequence $T_2$ is master and all others are slaves. Thus, if $T_1$ or $T_2$ should fail, the system will continue to operate with the other of these two masters performing its necessary function. It will be readily appreciated that the system may be operated with more than two masters or may be operated in an arrangement wherein each of the transponders in turn, or in some other sequence, operates as a master. Nevertheless a system in which the two transponders $T_1$ and $T_2$ alternate as masters has been mechanized and such an arrangement is preferred at present.

For the first step or sequence of mode C operation, all four transponders have their receivers set to receive the frequency of transponders $T_1$ which is the first master. This resetting, as previously mentioned, occurs at the midpoint of the B-6 sequence of mode B. Thus, $T_1$, the first master, transmits and each of $T_2$, $T_3$ and $T_4$ receives this transmission and immediately replies. In addition, upon receipt of the $T_1$ transmission, each of the transponders $T_2$, $T_3$ and $T_4$ resets its clock to an initial point in its cycle as will be described hereinafter. Further, $T_1$, the master, receives its own transmission and also resets its clock but does not again transmit in response to reception of its own transmission because of circuitry to be described below. Upon occurrence of the next midpoint in the cycle of each transponder as determined by its recently reset clock (reset upon transmission from the first master) each transponder sets its receiver to receive the second master, which in this exemplary arrangement, is transponder $T_2$. Now, upon the end of the first cycle in the C mode, the second master transponder, $T_2$, transmits and all others receive and immediately respond by transmitting on their own frequencies. Further, each transponder also again resets its clock upon receipt of transmission from the second master $T_2$. The latter also resets its own clock upon receipt of its own transmission, but does not again transmit. Now, upon attaining the midpoint of the second sequence of C mode operation, each transponder sets its receivers to receive the first master $T_1$. This alternation of sequences in mode C continues until the power supplies are exhausted or an external command is received for recycling or release.

TRANSPONDER RECEIVER

Figure 5:
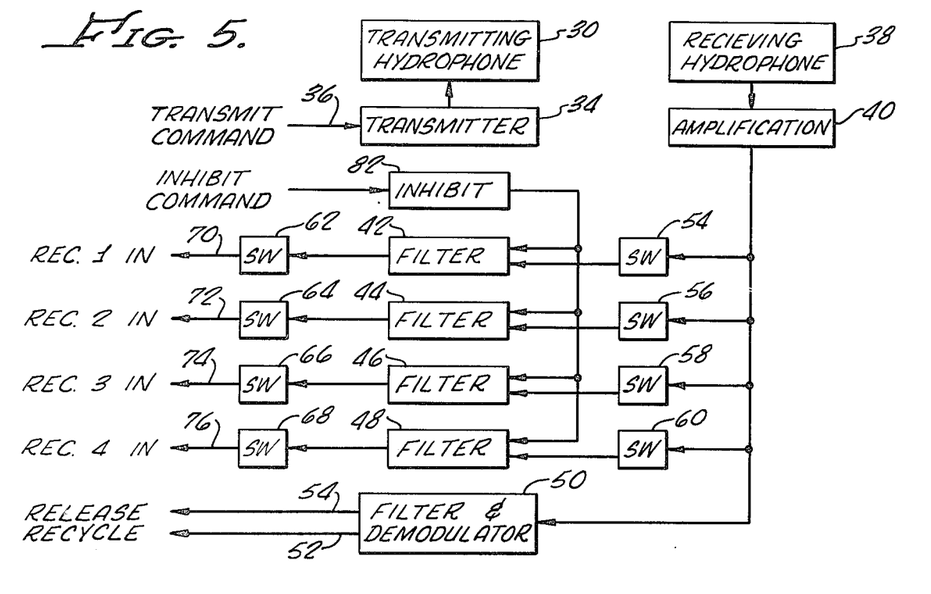
FIG. 5 is a block diagram of the receiving and transmitting equipment of one of the transponders.

In mechanization of the four transponder system described in relation to the functional diagram of FIG. 4, each transponder includes receiving and transmitting equipment arranged in the manner illustrated in FIG. 5. Since each transponder is identical to each other, a description of one will suffice to describe all. Each transponder includes a transmitting hydrophone 30 connected to project into the water a signal generated by a transmitter 34 under control of a signal on a transmit-command line 36. Preferably, the transmitted signal is a relatively short pulse of a selected frequency. In an exemplary embodiment, these frequencies are $T_1$, 3.2 kHz; $T_2$, 3.5 kHz; $T_3$, 3.8 kHz; and $T_4$, 2.9 kHz.

Each transponder also includes a receiving hydrophone 38 connected to receive transmitted signals and convert these to an electrical signal that is fed to amplification circuitry generally indicated at 40. In order to select different ones of the several transmitted frequencies, each receiver amplifier feeds to a plurality of filters 42, 44, 56, 48, 50 connected in parallel to the output of amplification circuitry 40. Filters 42 through 48 respectively are set to selectively pass individual frequencies such as those of transponders $T_1$, $T_2$, $T_3$ and $T_4$, respectively. Filter 50 includes a demodulator and is provided for the purpose of receiving a remotely generated command signal. In the exemplary embodiment, the command signal employs a 3.2 kHz carrier on which is modulated either a 110.9 Hz recycle command or a 94.8 Hz release command. Thus, filter demodulator 50, in response to the recycle or release command, will provide an output signal on recycle and release lines 52, 54, respectively.

Interposed between each of filters 42, 44, 46, 48 and the amplification circuitry 40, are a plurality of switches 54, 56, 58, 60 and a similar group of switches 62, 64, 66 and 68 are interposed between the output of the receiver filters and the lines 70, 72, 74 and 76 that are fed to the internal transponder logic. Basically, the switch groups 54 through 60 and 62 through 68 are formed by a dual multiplexer which is operated to selectively close the switches of one filter and open the switches of all other filters so that only one filter at a time is operably connected between the amplification circuitry 40 and the internal transponder logic. Thus, the transponder will respond only to a particular signal that is received and identified by the filter and switches. Filter demodulator 50 is always open so that an overriding command may be received and responded to at any time. As described below, an inhibit command signal fed via inhibit control circuitry 82 may be fed to each of the filters 42 through 48 (filter demodulator 50 is not inhibited) at the end of a mode B sequence, or for a mode A lock-out to be described below.

SIMPLIFIED FUNCTIONAL BLOCK DIAGRAM

Figure 6:
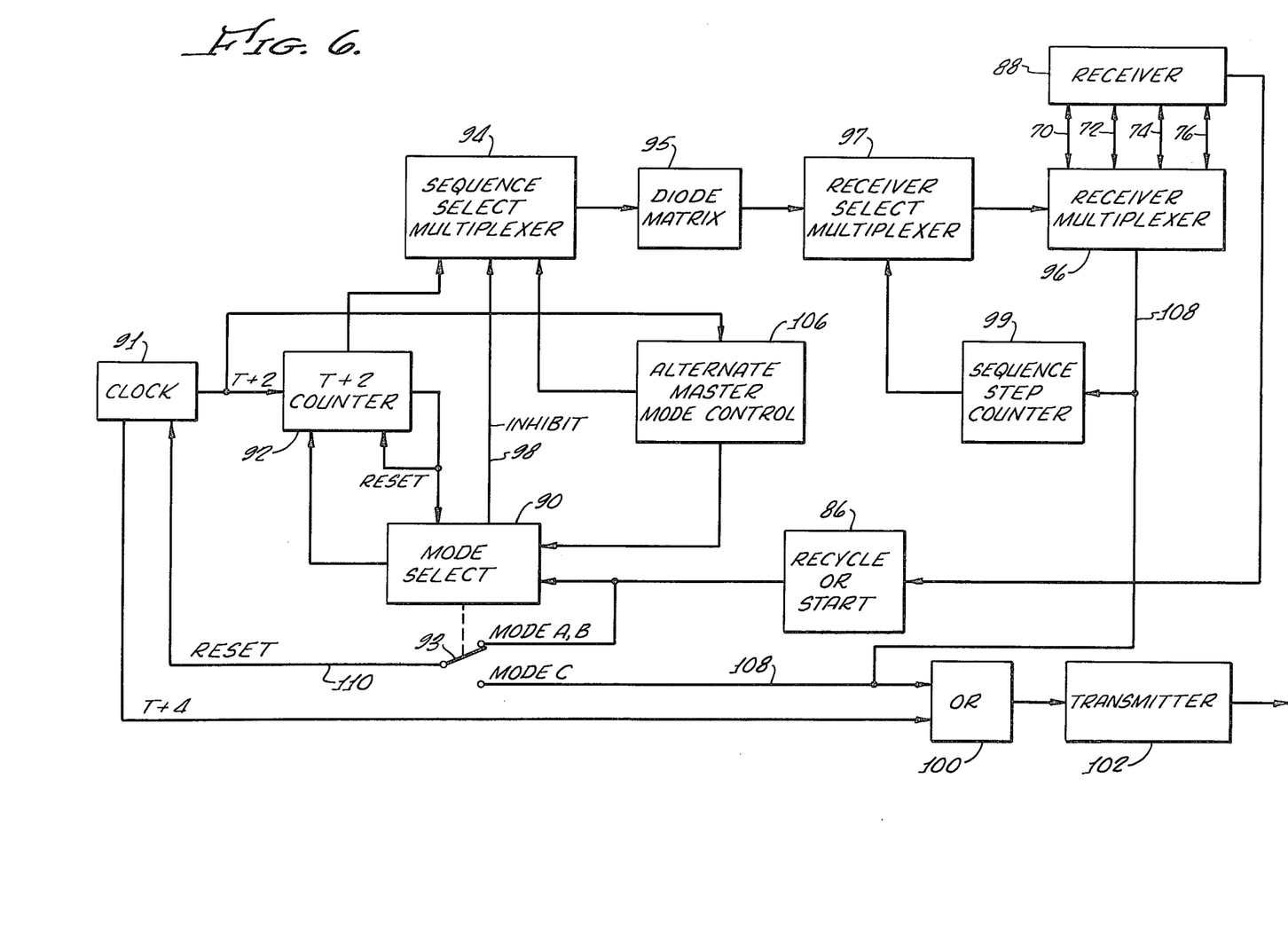
FIG. 6 is a simplified functional diagram of apparatus for carrying out the several operating modes of the described system of four transponders.

The receiving and transmitting apparatus of each transponder, as illustrated in FIG. 5, is connected with internal transponder logic of which a simplified functional diagram is shown in FIG. 6. It will be understood that FIG. 6 illustrates a number of the primary functions of the internal transponder logic and that additional auxilliary functions are employed as will be explained in connection with the description of the detailed block diagram of FIGS. 7a, 7b and 7c.

Referring now to FIG. 6, a start or recycle signal is manually set (prior to deployment) into a start circuit 86 or transmitted from a remote station to the transponder receiver 88 and thence to the circuit 86. The start or recycle signal is fed to mode select circuitry 90 which clears and resets a T+2 counter 92 and, via a clock reset select switch 93 (in mode A, B position) resets and synchronizes a system clock 91. The latter generates T+2 (mid-cycle) pulses and T+4 (cycle start) pulses which are interleaved so that each T+2 pulse is equi-spaced between a preceding and following T+4 pulse and the latter is also equally spaced between preceding and following T+2 pulses. In this embodiment a T+2 pulse occurs every four minutes and sixteen seconds and a T+4 pulse occurs about 2 minutes and eight seconds after each T+2 pulse, providing a 4 minute and sixteen second cycle period. T+2 pulses are counted by counter 92. Each T+4 pulse is fed to the transmitter 102 to cause a transmission from the transmitting hydrophone of the particular transponder (unless transmission is inhibited). In this first mode, mode A, a sequence select multiplexer 94 and a receiver multiplexer 96 both have their switching inhibited via a line 98 from mode select circuit 90. Accordingly, the receiver frequency remains fixed, each transponder being set to listen to its own transmitting frequency. Upon receipt of an echo of its own transmission from the water surface in mode A, the received signal is fed via an OR gate 100 to the transponder transmitter 102 for an acknowledging transmission. Then the system awaits the next T+2 pulse. The transmission, receipt of an echo and re-transmission of an acknowledgement signal will require a period of several seconds, depending upon the water depth. For example, in water depth of 10,000 feet, a round trip time of approximately four seconds is required. Thus, after this few seconds, the receiver awaits occurrence of the next T+2 pulse which occurs 2 minutes and eight seconds after the prior T+4 pulse that triggered the initial transmission. This T+2 pulse sets the counter to its next count and upon the following T+4 pulse, the transponder again transmits, receives its echo and re-transmits an acknowledgement signal whereupon it waits for the next T+2 and T+4 pulses. Thus there is a transmission, echo receipt and acknowledgement transmission every 4 minutes and 16 seconds from a given transponder. The T+2 counter counts each such transmission, (or more specifically each T+2 pulse) and upon attaining a predetermined count, such as a count of 60 for example, resets itself and triggers the mode select circuitry 90 to place the transponder in mode B.

In mode B, the sequence selector and receiver multiplexers are no longer inhibited and the T+2 counter will now count the six B mode sequences in the exemplary embodiment. The T+2 counter still counts each T+2 pulse but each count of the counter now is caused to step the sequence select multiplexer 94 from one channel to another. Each channel of the sequence select multiplexer is caused to select, via a diode matrix 95, a predetermined combination of channels of a receiver select multiplexer 97. Multiplexer 97, under control of the output of a sequence step counter 99, operates the control inputs of receiver multiplexer 96 to cause the latter to select one of the filters (and thus to select a particular signal) of the receiver via lines 70, 72, 74, 76. Sequence step counter 99 counts signals received by the receiver and fed via the multiplexor 96 to the received signal line 108. Thus, at each T+2 pulse, the individual transponder operates its sequence select multiplexer 94 via the T+2 counter to establish a group (two in the exemplary embodiment of FIG. 4) of selectable receiver frequencies for the particular sequence of the B mode. Within each particular sequence, the receiver select multiplexer 97 and receiver multiplexer 96 choose one of the receiver frequencies in accordance with the output of the sequence step counter. Thus, a different one of the two receiving frequencies which had been selected for a given B mode sequence by multiplexer 94, may be chosen after receipt of a signal which appears on line 108 to advance the sequence step counter and control the receiver select multiplexer. For example, transponder $T_1$ in sequence B-1 chooses the transmitting frequencies of $T_2$ and $T_4$, as indicated in FIG. 4. During B-1, and under control of the multiplexers 96, 97 and sequence step counter 99, $T_1$ will reset its receiving frequency from $T_2$ to $T_4$ transmitting frequencies.

Thus, having selected a group of receiving frequencies for a given sequence and making such selection upon the T+2 pulse, the system awaits the next T+4 pulse, at which time the appropriate master transponder transmits a signal. Now, in response to reception of this master transmission and subsequent transmissions from other transponders, the sequence step counter will change the selected receiving frequency by controlling receiver select multiplexer 97 upon each signal received by a given transponder. This received frequency switching by the sequence step counter is carried out in accordance with the mode B operation and mode B sequences described above and illustrated in FIG. 4. Only that one or two transponders which are to be masters in a particular sequence, are caused to transmit the T+4 pulse. Transmission by others is inhibited.

Upon completion of the six sequences of mode B, each leg and both diagonals of the quadilateral formed by the four transponders have been measured, the T+2 counter is inhibited, and mode select circuitry places the apparatus in condition for mode C. In this mode, the T+2 counter remains inhibited, the clock reset select switch 93 is moved to its mode C position and the sequence select multiplexer is now placed under control of an alternate master or mode C controller 106. This circuit causes the sequence select multiplexer to alternately switch between two channels to effectively carry out the mode C operations in which two sequences are continuously alternated, thereby providing alternation of master transponders. In one of the C mode sequences, as previously described, one of the transponders $T_1$, for example, is the master and all others are slaves. Thus, all four transponders are set to receive the transmission frequency of the master $T_1$. In the other of the two mode C sequences, a second transponder, such as $T_2$, is made master. All others are slaves and all four transponders are set to receive the transmitting frequency of the master transponder $T_2$. Thus, the multiplexer is caused to alternate between two channels in which the receiver is conditioned for one or the other of two frequencies and this alternation is directed by the alternate master mode C controller 106 under control of T+2 pulses from the clock 91.

A significant feature of the mode C operation is that it enables the system to employ a crude and relatively rough or inaccurate clock, even though the system may continue to operate for long periods of time. Clock drift and inaccuracy, unless of improbably gross amount, have no adverse effect upon relative synchronization of the four transponders because of the unique self-synchronization that is employed. This self-synchronization is simply achieved by causing each transponder to reset its own clock to its reset point (which is the initiation of a T+4 pulse) immediately upon receipt of a transmitted signal. Thus, each slave transponder in mode C, upon receipt of a signal transmitted from a master transponder, feeds this signal via line 108 and clock reset select switch 93 to the transponder reset line 110 to reset the clock 91. Similarly, the master transponder itself will receive its own signal and thus reset its own clock in response to such receipt at the beginning of a T+4 pulse. Accordingly, all four transponders are reset substantially in response to transmission from the master transponder in mode C.

Depending upon the distance between the several transponders, they will reset at different times because of the travel times of the transmitted pulse from the master to the several slave transponders. Nevertheless, with transponders positioned approximately one to three miles apart, transmission time of a pulse under water is in the order of one to three seconds. Thus, the self-synchronization and self-resetting will bring the several clocks of the various transponders into synchronization with one another within such a time interval. That is, they will not be out of synchronism by more than just a few seconds upon any resetting. Further, such resetting occurs upon each transmission. Thus, the clocks can drift substantially during a period of four minutes and sixteen seconds and yet they will all be brought back to effective synchronism upon each transmission.

DETAILED DESCRIPTION OF TRANSPONDER LOGIC

Figure 7A:
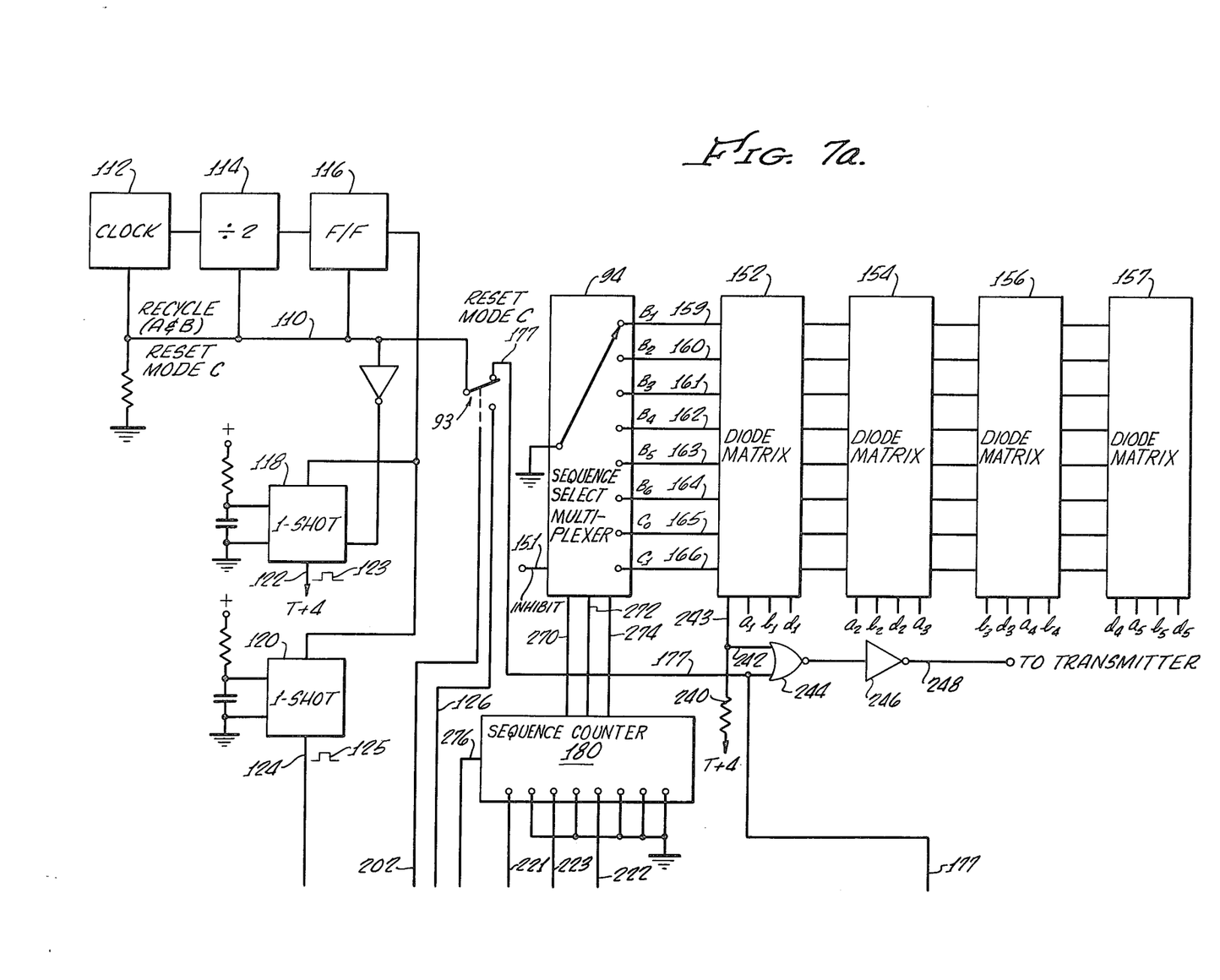
FIGS. 7a, 7b and 7c together comprise a detailed block diagram of an exemplary mechanization of logic of a single transponder of a system employing four transponders.
Figure 7B:
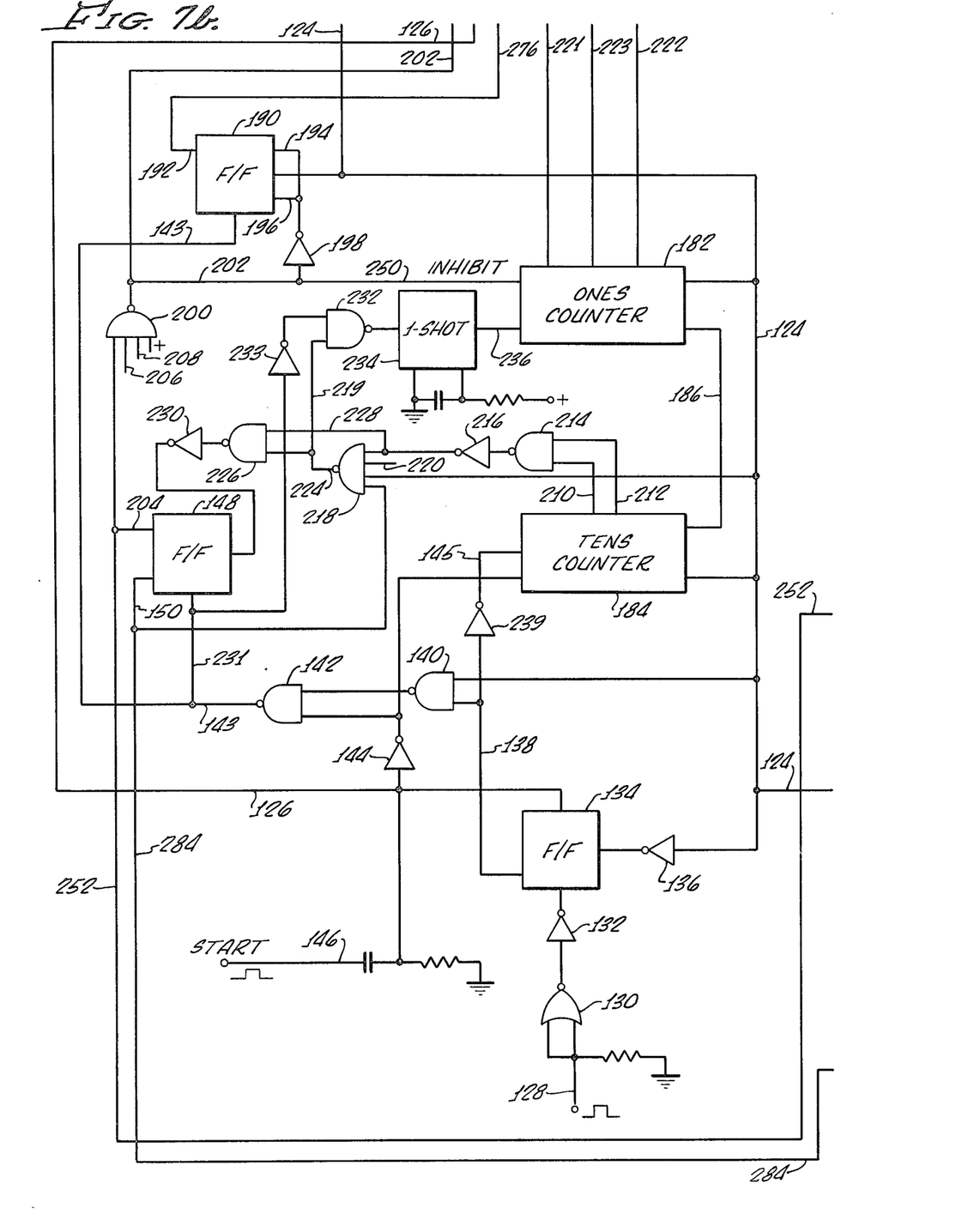
Figure 7C:
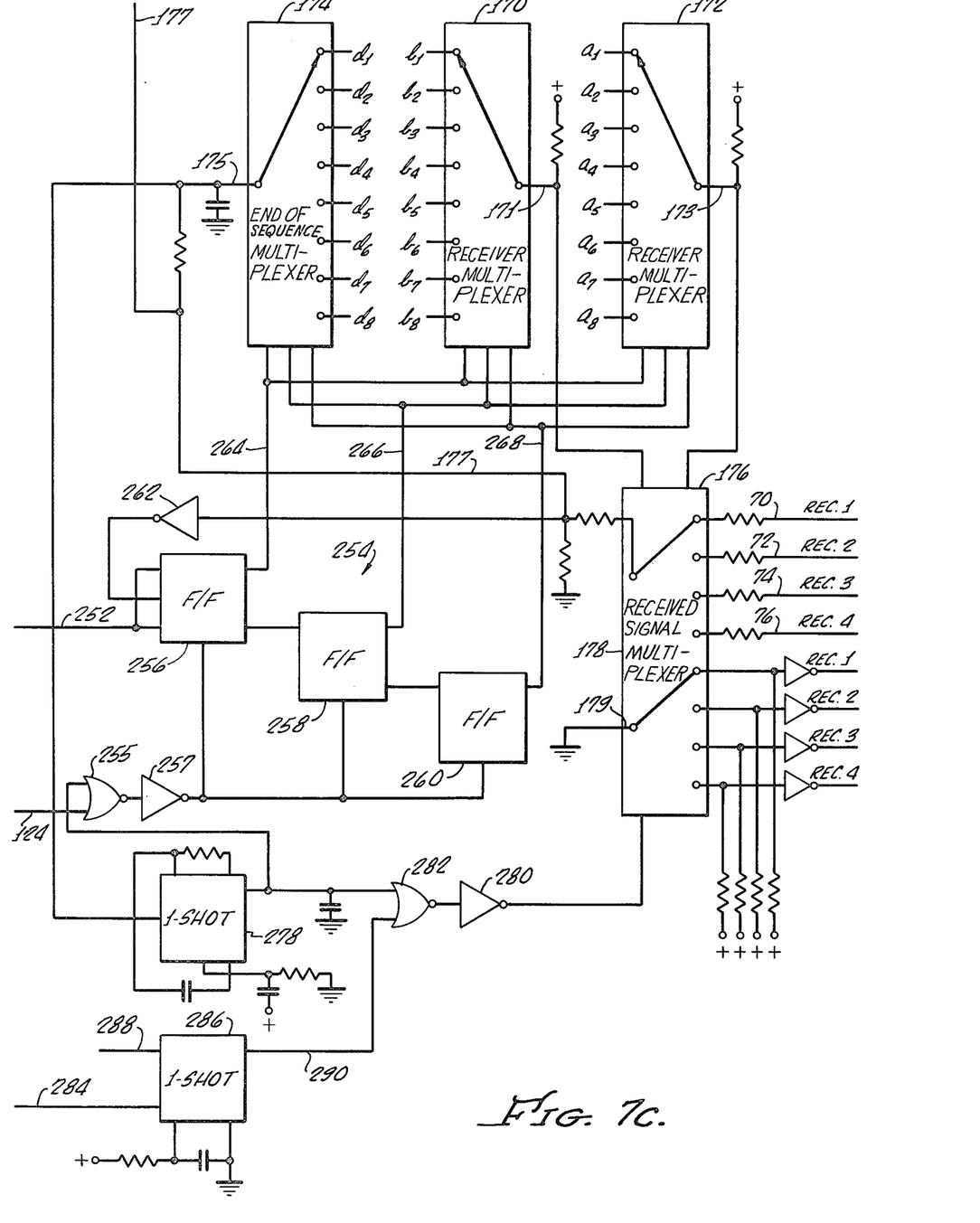

Illustrated in FIGS. 7a, 7b, 7c is a detailed block diagram of the apparatus functionally illustrated in FIG. 6 and which comprises internal logic carried in each of the transponders. These figures form a unitary diagram when FIGS. 7b and 7c are positioned side by side with FIG. 7b on the left and with FIG. 7a positioned across the top of both FIGS. 7b and 7c. Although the circuitry is identical for each of the transponders, the programming of each of the circuits will be different in order to accomplish the various sequences of mode B and mode C operation wherein different transponders operate in different conditions at different sequences. The system clock includes a master clock 112 that provides an output signal of one pulse per second fed to a divide by 128 circuit including a divider 114 and a counter output flip-flop 116. The output of flip-flop 116 is a square wave having a full cycle of four minutes and sixteen seconds and a half cycle of two minutes and eight seconds. This square wave is fed to pulse shaping circuits in the form of first and second monostable multivibrators 118, 120 which provide on the respective output leads 122 and 124 thereof the T+4 pulse 123 and the T+2 pulse 125. In modes A and B the clock is reset and the monostable circuit 118 is inhibited by a start signal on line 126 that is fed to the switch 93 (shown in mode C position) and thence to the clock reset line 110. The clock is reset in mode C upon each signal reception, which produces a reset signal on line 110 via switch 93 and a line 177. In modes A and B the clock is reset by a start command which produces a reset signal on line 110 via switch 93 and line 126.

A recycle signal received through the continuously open command channel of the transponder receiver on line 128 is twice inverted in a NOR gate 130 and an inverter 132 and fed to reset a recycle flip-flop 134 which is toggled by the T+2 pulse on line 124 fed to the toggle input of the flip-flop via an inverter 136. When reset, flip-flop 134 provides a high output at lead 138 which is fed to a NAND gate 140 together with the next T+2 pulse to provide a low at one input of a NAND gate 142, and thus a high at the output of this gate. The output of gate 142 is fed to the reset input of a mode A flip-flop 148 forming part of the mode select circuitry 90 (FIG. 6).

A second input to the gate 142 is provided via an inverter 144 and a start signal pulse which is fed by a suitable command switch (not shown) to a line 146. Thus, either the recycle or the start signal will provide a high at the output of gate 142 and reset the mode A flip-flop. It may be noted that the flip-flops and multivibrators employed are of the type that are toggled or triggered to change state upon a positive or negative going edge of its toggle or trigger input. The terms high and low are employed to denote a logical one and logical zero respectively.

When reset by the high signal from the output of gate 142 flip-flop 148 provides a high signal on its output line 150 which commands the system to stay in mode A. This mode A signal on line 150 is also fed via a lead (not shown) to inhibit the sequence select multiplexer 94 and a plurality of programmed diode matrices 152, 154, 156 and 158. These programmed matrices have inputs on channels indicated at 159, 160, 161, 162, 163, 164, 165 and 166, that are selectively grounded as the sequence select multiplexer 94 steps from one of its output channels to another. The several matrices have a plurality of output lines designated $a_1$, $a_2$, $a_3$, $a_4$, $a_5$, $b_1$, $b_2$, $b_3$, $b_4$, $b_5$, $d_1$, $d_2$, $d_3$, $d_4$, $d_5$, which are connected by leads (not shown) to correspondingly designated input leads of a pair of receiver multiplexers 170, 172 and to the corresponding leads of an end of sequence multiplexer 174. Multiplexers 170, 172 and 174 accordingly have output lines 171, 173 and 175 respectively, which are selectively connected to ground via the programmed diode matrices and sequence select multiplexer as the several multiplexers step from one channel to the other.

The two outputs, on leads 171, 173 of the receiver select multiplexers 170, 172 are fed in common as stepping control inputs to a received signal multiplexer 176 and to a receiver command multiplexer 178. Multiplexers 176, 178 operate in synchronism from their common stepping inputs. Multiplexer 176 has an output line 177 on which appears the selected received signal for transmission to the internal logic of the transponder. Multiplexer 178 has an output lead 179 that is connected to ground. Receiver command multiplexer 178 is functionally equivalent to switches 54, 56, 58 and 60, illustrated in FIG. 5, to selectively couple the receiver amplifying circuitry to one or another of the filters as this multiplexer is caused to step. Similarly, multiplexer 176 is analagous to receiver input switches 62, 64, 66 and 68 which are operated together with a corresponding switch of the group of switches 54 through 60 for selection of a given filter and receiver frequency. Thus, a particular position of sequence select multiplexer 94 provides a set of signals via the programmed diode matrices to select a given position of the receiver select multiplexers 170 and 172 which, in turn, by virtue of their selected position, will select a given position of the multiplexers 176, 178. These, of course, select the desired receiver frequency.

Sequence select multiplexer 94 is operated via a sequence counter or encoder 180 from the T+2 counter 92 which is formed of a one's counter 182 and a ten's counter 184. One's counter 182 counts T+2 pulses on line 124 and, upon reaching a count of ten, provides a counting input via line 186 to the ten's counter 184. The latter is reset or cleared upon start via a lead (not numbered) from the output of inverter 144.

In mode A the sequence select multiplexer 94 is inhibited by the high at the output 150 of flip-flop 148 which is fed to a multiplexer input 151 via a lead (not shown).

A mode C flip-flop 190 (part of the alternate master circuit of FIG. 6) has an output on a line 192 which alternates between high and low in response to the T+2 pulses which are fed via line 124 to the toggle input of this flip-flop. However, flip-flop 190 remains reset whenever the signal on its inputs 194 and 196 are low. The signals on these inputs are controlled via an inverter 198 and a mode A AND gate 200 via a line 202. The signal on line 202 is high in modes A and B and low in mode C. The mode A flip-flop 148 when in mode A, provides a low output to an input 204 of gate 200 thereby to retain the high output on line 202 which keeps the flip-flop in its reset condition. The mode A flip-flop 148 is toggled at the end of mode A and then the six sequences of B mode sequence may commence. When these six sequences have been counted, inputs 206 and 208 of NAND gate 200 go high and, since the fourth input of the gate 200 is fixedly connected to a high, the output of mode control gate 200 goes low at the end of mode B. This releases the mode C flip-flop 190 for toggling upon each T+2 pulse.

The first mode A operation continues for several hours to allow time to deploy all of the transponders, which may be deployed in large numbers, as previously mentioned, and also to permit establishment of the data collecting stations before the first mode A has been completed. For this reason, it is chosen to continue this first mode A operation for approximately four hours. In this first mode A operation, the counters 182, 184 count T+2 pulses and upon reaching the count of 60, outputs 210 and 212 of the ten's counter go high. Both inputs to a NAND gate 214, which are connected to outputs 210, 212, go high, providing a high at the output of an inverter 216, which is connected to the output of gate 214. A high is thus fed to the input 228 of a NAND gate 226. The other input of gate 226, on line 224, is also high. The latter input is derived from the output of a four input NAND gate 218 having inputs from line 150 (mode A), line 124 (T+2), inverter 216, and (on its input 220) from the output 222 of the one's counter. The output of gate 218 is high at the count of 60 because its input 220 is low. Thus, gate 226 has both of its inputs high and its output goes low to cause the output of an inverter 230 to go high. The inverter is connected between the gate 226 and the toggle input of flip-flop 148. The flip-flop is toggled by the changing signal at its toggle input and places the system in mode B.

In response to a recycle command from a remote station the system begins a short mode A cycle, regardless of its mode of operation (mode A, B or C) at the time of reception of the recycle command. In the short mode A cycle, which the system initiates in response to a recycle command on line 128, only four repetitions of the depth measurement are employed. Recycle flip-flop 134 provides an output on line 138 which, via an inverter 239, presets the ten's counter 186 to its count of 60. This provides a low at the output of gate 214 and a high at the output of inverter 216. The system commences its mode A operation and, upon occurrence of the fourth T+2 pulse (which follows the fourth transmission commanding T+4 pulse) in this mode, input 220 of gate 218 goes high. Since all of the inputs to this gate are now high, its output goes low to cause the toggle input of the mode A flip-flop 148 to go low. Upon termination of this fourth T+2 pulse in the short mode A operation, the output of gate 218 goes high and the toggle input of the flip-flop 148 changes from low to high to toggle this flip-flop.

The one's counter 182 is cleared upon start and recycle and also cleared upon completion of a short mode A. Upon completion of the count of 60 in a long mode A, the one's counter is at its zero count, as it is upon the count of each ten T+2 pulses and does not have to be cleared. Upon start a low is provided to one input of gate 142. Upon the next T+2 pulse and after a recycle a low is provided at the other input of gate 142 which, via a line 231, an inverter 233 and NAND gate 232, triggers a monostable multivibrator 234 that has an output connected to the clear input of the one's counter.

The output of gate 218 is also connected to a second input of gate 232 by a line 219. When the output of gate 218 goes from high to low upon the fourth T+2 pulse of a short mode A operation, gate 232 is caused to trigger multivibrator 234 and clear counter 182.

During mode A and B operation, each T+4 pulse at line 122 of monostable multivibrator 118 is fed (by means of a lead not shown) through a resistor 240 to a first input 242 of a NOR gate 244. The output of gate 244 is passed through an inverter 246 and thence fed on line 248 to command a transmission from the transmitter 102. Each reflection is received by the receiver, fed through the selected filter, and thence fed to the output line 177 of received signal multiplexer 176. From output line 177 the received signal is fed as the second input to the NOR gate 244 and thus will command a second transmission, the transmission of an acknowledgement signal upon receipt of a reply or echo. Each received signal in mode C is fed via line 177 and switch 93 to the clock reset line 110.

It will be recalled that although transponders transmit at each T+4 pulse in mode A, only selected ones of the transponders will transmit at each T+4 pulse in modes B and C. This selection is controlled by a signal on line 243 from the output of diode matrix 152 under control of sequence select multiplexer 94. Line 243 is caused to inhibit transmission via NOR gate input 242 except in those sequences of mode C and mode B wherein the particular transponder is to be master.

Having counted 60 (or 4) transmissions, flip-flop 148 is toggled to provide a low on its output 150 and a high on its output 204. The counters have been reset, the mode C output line 202 from gate 200 is still high and thus, the flip-flop 190 which controls the sequencing in mode C cannot toggle. Further, the mode C output line 202, being high in both modes A and B, provides an enabling input at line 250 to the one's counter 182. Thus, this counter will count T+2 pulses in both modes A and B but is inhibited or disabled in mode C.

In mode B a low output on lead 150 removes the inhibit from line 151 of sequence select multiplexer 94 which accordingly is free to step under control of sequence counter 180. Similarly a high output from the other side of flip-flop 148 is fed via a line 252 to enable a sequence step counter 254 formed of a plurality of interconnected flip-flops 256, 258 and 260. Sequence step counter receives a counting input at the toggle input of its first flip-flop 256 via an inverter 262 from the received signal line 177 of multiplexer 176. Accordingly, the sequence step counter, which is enabled in mode B, counts the number of received signals. The outputs of the flip-flops of this counter 254 are fed via lines 264, 266 and 268 as control logic on the three controlling inputs leads of each of the receiver select multiplexers 170, 172 and the end of sequence multiplexer 174. Thus, it is this sequence step counter which causes multiplexers 170, 172 and 174 to step from one channel to the next and to perform this stepping upon reception of a signal by the receiver. The stepping pattern is determined by the interconnection of the multiplexer channel controlling leads with the output of the sequence step counter 254.

As the one's counter 182 counts T+2 pulses in mode B, it provides on its output lines 221, 222 and 223, signals representing the counts of one, two and four, respectively. Thus, line 221 is high at the count of one, line 223 is high at the count of two, both of these are high at the count of three, and line 222 is high at the count of four. Both lines 223 and 222 are high at the count of six in which condition line 221 is low. These output lines of counter 182 are fed to three of the inputs of sequence counter 180 which has the other five inputs thereof grounded. Counter 180 has three output leads 270, 272 and 274 and a carry input lead 276. In mode B operation, carry input lead 276, which is connected to output 192 of the mode C flip-flop 190, remains low. Therefore, output leads 270, 272 and 274 of sequence counter 180 provide combinations of logical one's and zero's to the three position controlling inputs of sequence select multiplexer 94, which combinations vary with the count contained in counter 182. Thus, as counter 182 counts from one through six in mode B, the sequence select multiplexer is caused, via counter 180, to sequentially ground each of its output lines 159, 160, 161, 162, 163 and 164 in turn. This stepping of the sequence select multiplexer 94 enables the apparatus to move through the previously described six sequences of mode B by causing the diode matrices 152, 154, 156 and 158 to drive the receiver select multiplexers 176 and 178 to select one or the other of the receiver filters, all in accordance with the program of receiver selection described above in connection with the description of FIG. 4. As previously mentioned, each receiver is set at T+2 for a specific reception. It is this pulse T+2 which is counted by the counter 182. Upon receipt of each additional pulse, the counter augments its count by one unit and the sequence select multiplexer 94 is moved to another channel to thereby condition the other multiplexers for selection of the appropriate receiver filters for this sequence.

As previously described in connection with the operation illustrated in FIG. 4, each transponder will cease its operation after it has received a selected number of signals in the course of a specific one of the B mode sequences. Upon occurrence of this end of sequence condition, the receiver of the given transponder is inhibited. To this end, the end of sequence multiplexer of each transponder is caused to connect a selected one of its channels according to the count of the sequence step counter 254 which provides inputs to the multiplexer control terminals of the end of sequence multiplexer. When the transponder has received its predetermined number of signals multiplexer 174 has been moved to a position at which the end of sequence for this particular transponder must occur. Its output line 175 then is caused to uniquely provide a positive going pulse that is fed to trigger a monostable multivibrator 278 having a period of approximately 60 seconds. This multivibrator provides an inhibit signal to the receiver multiplexers 176 and 178 via an inverter 280 and a NOR gate 282. Thus, upon occurrence of an end of sequence, as determined by the end of sequence multiplexer 174 under control of the sequence step counter 254, all receiving channels other than the command channel are inhibited for 1 minute.

The sequence step counter is also reset at this time. Upon triggering of multivibrator 278 for end of sequence inhibit, its output goes high and, via a NOR gate 255 and inverter 257, is caused to reset each of the flip-flops of the sequence step counter 254. The sequence step counter is also reset upon occurrence of each T+2 pulse on line 124 which is fed as a second input to the NOR gate 255. As previously described, it is the T+2 pulse which augments the one's counter to cause multiplexer 94 to step and select a group of receiving frequencies for the following sequence.

It may be noted that the receivers are also inhibited in mode A operation for approximately one second in order to eliminate receipt of reflections from nearby obstacles or objects on the ocean bottom, and from the bottom itself. Further, transmitting circuitry itself requires some time for recovery before it can retransmit and thus, even in the absence of such specific receiver inhibition, a signal received immediately after (within a few milliseconds) a transmission will not command a second transmission. Nevertheless, in mode A, where water depth in the order of many thousand feet is being measured, it is found convenient to lock out reception for one second after transmission and thus eliminate reflection from objects at a distance of approximately 2500 feet or less. To this end, the mode A control signal on line 150 is fed via a lead 284 to enable a monostable multivibrator 286 which therefor is inoperative in modes B and C. A trigger input to the multivibrator 286 is provided on an input 288 from the transmit out signal on transmit command line 248 to which input 288 is connected via a lead (not shown). Thus, in mode A, the multivibrator 286 is triggered upon each transmission and provides, via its output line 290, a second input to NOR gate 282 which is fed to inhibit the receivers for the duration of the time established by this multivibrator. After receipt of an echo in mode A, an end of sequence inhibit signal is provided via line 177 to trigger monostable multivibrator 278. This inhibits the receiver for 1 minute.

The end of mode B is determined by the one's counter, which upon reaching the count of six provides a high at its two's and four's output lines 223 and 222, respectively, which are connected (via leads not shown) to the inputs 206 and 208 of NAND gate 200. Thus, upon reaching the count of six, all of the inputs to NAND gate 200 are high in mode B and the output of gate 200 goes low, thus commanding operation in mode C.

In mode C, the low signal on line 202 is fed to the inhibit line 250 of the one's counter so that this counter remains at its count of six which is reached at the end of mode B. The signal on line 202 is also fed via inverter 198 to enable the mode C flip-flop which now toggles to change its state upon each T+2 pulse which is fed to its toggle input. As the mode C flip-flop 190 toggles, its output on line 192 alternates between logical one and logical zero, changing at each T+2 and this operation commands the two mode C sequences in which two of the four transponders alternate as masters.

The inputs to sequence counter 180 in mode C remain fixed since the one's counter 182 is inhibited. Its carry input on line 276 now alternates between high and low. This causes the the output of the sequence counter on lines 270, 272 and 274, which are connected to the control lines of the sequence select multiplexer 194, to alternate between two combinations of highs and lows which, in turn, cause the multiplexer 194 to alternately switch between those two of its channels having the output leads indicated at 165 and 166. As multiplexer 194 repetitively switches between its outputs 165 and 166 in mode C, remaining in each position for one full 4 minute 16 second cycle, the receiver select multiplexers 170 and 172 and in addition, the multiplexers 176 and 178 are operated so as to set the responder to listen to one or the other of the two master frequencies. For example, with the multiplexer 94 connected to enable its output lead 165, the transponder selects the filter for reception of transmitting frequency of $T_1$. When its output lead 166 is enabled the filter for reception of the transmitting frequency of $T_2$ is selected. This alternate operation in mode C continues until a recycle command is received or until the power supply is exhausted. Circuitry (not shown) is employed to cause each transponder upon receipt of a second remotely transmitted and uniquely modulated command to operate mechanisms to release the transponder from its anchor and allow its float to bring it to the surface for recovery of the instrument.

It will be readily appreciated that the logic illustrated in FIGS. 7a, 7b and 7c is merely exemplary of one mechanization of the method and apparatus of the present invention as embodied in a four transponder set. The illustrated logic employs standard components readily available and connected as illustrated in the drawings. By way of example and without limitation, the several components employed in an exemplary embodiment are identified as follows: multivibrators 118, 120 and 286 are Motorola Part Nos. MC14528. Clock 112 is a Statek 715-639-7810. Diode matrices are each Harris Part Nos. HMI-1-014. Counters 182 and 184 are National Part Nos. 74C160. All the remaining parts are RCA part numbers. NOR gates are Part Nos. CD4001, the NAND gates are Part Nos. CD4011, sequence counter 180 is CD4008, all inverters are Part Nos. CD4009, divider 114 is CD4024, all of the flip-flops are CD4027, multivibrator 278 is Part No. CD4047, multiplexers 94, 170, 172 and 174 are Part Nos. CD4052 and clock reset select switch is provided by a portion of Part No. CD4053.

A system of only one pair of transponders or a line of spaced pairs may be employed to enable navigation through points spaced midway between transponders of a single pair. Such points, defined by a series of spaced pairs, may be employed to enable navigation along a channel or linear waterway, for example, by maneuvering so that signals emitted by transponders of a single pair are received simultaneously (after allowance for travel time between transponders).

Mode C need not be employed in all cases. For example, after having established transponder positions in modes A and B, the transponders may be set to go into a conventional transponding operation, merely replying to interrogation signals from the station or object that is to be navigated. Such object would then navigate by conventional range solutions, based upon signal travel time between the object and each of a plurality of transponders.

The foregoing detailed description is to be clearly understood as given by way of illustration and example only, the spirit and scope of this invention being limited solely by the appended claims.

What is claimed is:

1. The machine method of establishing a navigation reference system comprising the steps of emplacing a plurality of pairs of transponders at fixed positions, transmitting an interrogation signal from a first transponder of each pair to a second transponder of each pair, receiving at the second transponder of each pair the signal transmitted thereto from the first transponder of such pair and in response thereto sending a reply signal from said second transponder back to said first transponder of each pair, transmitting an acknowledgement signal from the first transponder of each pair in response to receipt thereat of the reply signal from the second transponder of such pair, receiving at a remote station both the interrogation and acknowledgement signals from the first transponder of each said pair, repetitively transmitting master interrogation signals from one of said transponders, receiving each of said master interrogation signals at transponders of a group of slave transponders, transmitting a reply signal from each of said slave transponders upon receipt of each of said master interrogation signals from said one transponder, repetitively transmitting second master interrogation signals from a second transponder, said second master signals being transmitted in a predetermined chronological relation with respect to the transmission of said first named master interrogation signals, receiving said second master interrogation signals at the transponders of a second group of slave transponders, transmitting a reply signal from the transponders of each of said second group of slave transponders upon receipt of each said second master interrogation signal, whereby a plurality of said transponders are caused to act as master transponders to thereby provide a measure of redundancy, said first named and second master interrogation signals being each uniquely identified and including the steps of setting and resetting said transponders to selectively respond to uniquely identified master interrogation signals from each of said first and second transponders at different times.

2. The method of claim 1 including independently timing the operation of each of a group of said transponders and synchronizing said timing in response to receipt of at least some of said signals.

* * * * *